(12) United States Patent
Higa

(10) Patent No.: US 12,265,893 B2
(45) Date of Patent: Apr. 1, 2025

(54) LEARNING DEVICE, LEARNING METHOD, AND LEARNING PROGRAM

(71) Applicant: NEC Corporation, Tokyo (JP)

(72) Inventor: Ryota Higa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 982 days.

(21) Appl. No.: 17/296,798

(22) PCT Filed: Dec. 7, 2018

(86) PCT No.: PCT/JP2018/045113
§ 371 (c)(1),
(2) Date: May 25, 2021

(87) PCT Pub. No.: WO2020/115904
PCT Pub. Date: Jun. 11, 2020

(65) Prior Publication Data
US 2021/0398019 A1    Dec. 23, 2021

(51) Int. Cl.
*G06N 20/00* (2019.01)
*G06N 5/01* (2023.01)
*G06N 7/01* (2023.01)
*G06N 10/60* (2022.01)

(52) U.S. Cl.
CPC ............. *G06N 20/00* (2019.01); *G06N 10/60* (2022.01); *G06N 5/01* (2023.01); *G06N 7/01* (2023.01)

(58) Field of Classification Search
CPC .......... G06N 20/00; G06N 10/00; G06N 5/01; G06N 7/01; G06N 10/60
See application file for complete search history.

(56) References Cited

U.S. PATENT DOCUMENTS

| 2008/0260257 A1 | 10/2008 | Rose |
| 2017/0364831 A1 | 12/2017 | Ghosh et al. |
| 2019/0385061 A1* | 12/2019 | Chaudhury .............. G06N 7/01 |

FOREIGN PATENT DOCUMENTS

| JP | 2010525431 A | 7/2010 |
| JP | 2017091272 A | 5/2017 |

OTHER PUBLICATIONS

Japanese Office Communication for JP Application No. 2020-558788 mailed on Jun. 21, 2022 with English Translation.
International Search Report of PCT Application No. PCT/JP2018/045113 mailed Feb. 26, 2019.
English translation of Written opinion for PCT Application No. PCT/JP2018/045113 mailed on Feb. 26, 2019.
Uchida et al. "Estimation of the change of agent's behavior strategy using state-action history". IEICE Technical Report, Mar. 6, 2017, vol. 116, No. 521, pp. 7-12, in particular, p. 8, ISSN 0913-5685.

* cited by examiner

*Primary Examiner* — Quoc A Tran

(57) ABSTRACT

A learning device 80 is a learning device for learning a model applied to a device that performs processing using a specific model, includes an input unit 81 and an imitation learning unit 82. The input unit 81 receives input of a functional form of a reward. The imitation learning unit 82 learns a policy by imitation learning based on training data. The imitation learning unit 82 learns a reward function depending on the input functional form of the reward by the imitation learning.

8 Claims, 2 Drawing Sheets

LEARNING DEVICE, LEARNING METHOD, AND LEARNING PROGRAM

TECHNICAL FIELD

The present invention relates to a learning device, a learning method, and a learning program for learning a model applied to a device that performs processing using a specific model.

BACKGROUND TECHNOLOGY

A next-generation computer based on a quantum mechanical principle (hereinafter referred to as "quantum computer") has been proposed as a device that can realize large amounts of calculations at high speed. A quantum computer is a computer that performs a calculation using quantum effect. A quantum computer performs a calculation at high speed, using superposition property.

Among quantum computers, an annealing machine is a computer that operates in a method specialized for a combinatorial optimization problem (quantum annealing method), and operates by receiving parameters for a computation model that operates internally. One example of a computation model is an Ising model. A device that performs a calculation based on such a specific model is hereinafter referred to as a specialized device.

For example, patent literature 1 describes a method for improving the accuracy and computation time of automatic image recognition by implementing an association graph and a quantum processor. In the method described in the patent literature 1, an image matching problem is formulated as a quadratic unconstrained binary optimization problem, and the formulated problem is mapped to a quantum processor to operate the quantum processor to obtain a solution.

CITATION LIST

Patent Literature

Patent Literature 1: Japanese Patent Laid-Open No. 2010-525431

SUMMARY OF INVENTION

Technical Problem

While a specialized device can perform processing at high speed, it is necessary to design an objective function in a form that can be solved by the specialized device according to the problem to be solved. Therefore, when using quantum annealing and a specialized device, the analyst needs to express a real-world problem to be solved in a specific physical model (for example, Ising model).

However, it is not easy to represent such a real-world problem with a specific model. Therefore, even if the processing by the specialized device is fast, it takes a lot of time to model the problem, and as a result, such a problem that a little effect is obtained is increased because a lot of costs are required. For example, even with the method described in patent literature 1, designing an equation to be mapped to the quantum processor as an optimization problem in image recognition is itself very costly.

On the other hand, in recent years, a lot of data indicating real-world phenomena have been acquired. These acquired data can be said to be a group of information indicating real-world problems. Therefore, it is desirable to be able to directly generate a specific model using data that shows real-world phenomena, rather than having an analyst design a specific model to be used in a quantum computer from scratch.

Therefore, it is an object of the present invention to provide a learning device, a learning method, and a learning program that can directly learn a specific model to be used in a quantum computer from acquired data.

Solution to Problem

A learning device according to the present invention is a learning device for learning a model applied to a device that performs processing using a specific model, includes an input unit which receives input of a functional form of a reward; and an imitation learning unit which learns a policy by imitation learning based on training data, wherein the imitation learning unit learns a reward function depending on the input functional form of the reward by the imitation learning.

A learning method according to the present invention is a learning method for learning a model applied to a device that performs processing using a specific model, implemented by a computer, includes receiving input of a functional form of a reward; learning a policy by imitation learning based on training data; and learning a reward function depending on the input functional form of the reward by the imitation learning.

A learning program according to the present invention is a learning program applied to a computer for learning a model applied to a device that performs processing using a specific model, causing the computer to execute an input process of receiving input of a functional form of a reward; and an imitation learning process of learning a policy by imitation learning based on training data, wherein in the imitation learning process, the learning program causes the computer to learn a reward function depending on the input functional form of the reward by the imitation learning.

Advantageous Effects of Invention

According to the present invention, a specific model used in a quantum computer can be learned directly from the acquired data.

DESCRIPTION OF EMBODIMENTS

Hereinafter, example embodiments of the present invention will be described with reference to the drawings.

Figure 1:
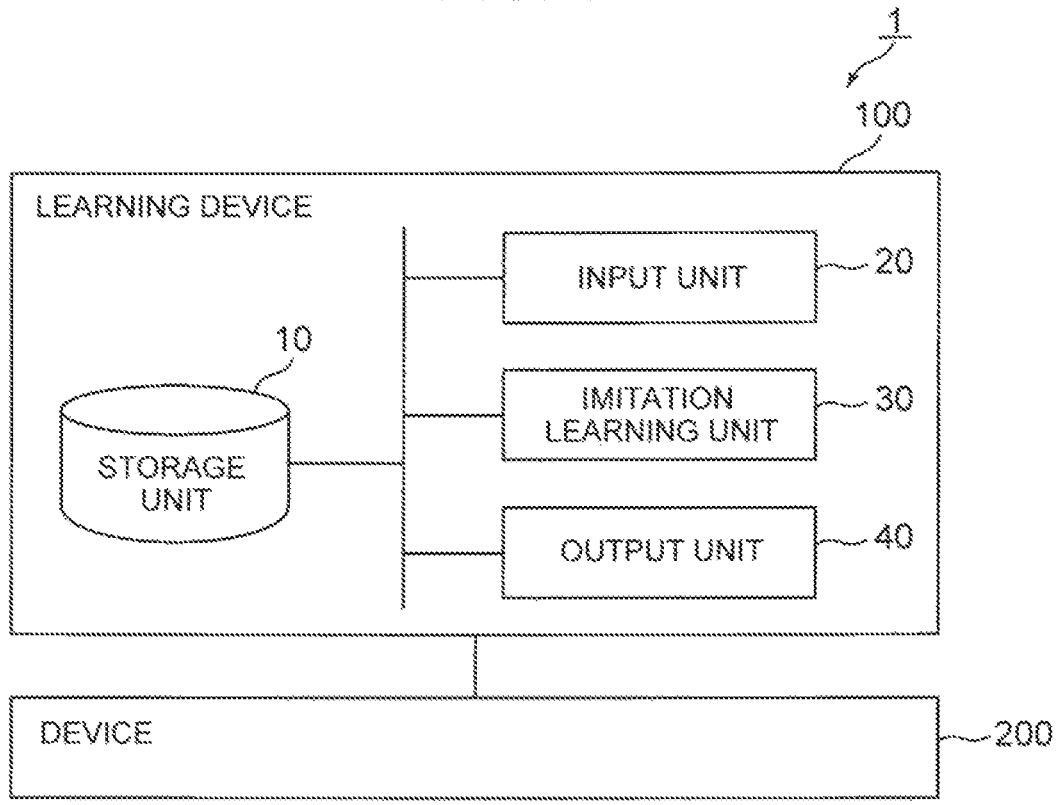
FIG. 1 It depicts a block diagram showing an example embodiment of an information processing system including a learning device according to the present invention.

FIG. 1 is a block diagram showing an example embodiment of the information processing system 1 including a learning device 100 according to the present invention. The information processing system 1 of this example embodiment comprises a learning device 100 and a device 200.

The device 200 is a quantum computer that operates based on a specific model. In this example embodiment, the case where the device 200 is a quantum annealing machine will be described by way of example. However, the type of the device 200 is not limited to a quantum annealing machine.

The learning device 100 includes a storage unit 10, an input unit 20, an imitation learning unit 30, and an output unit 40. The learning device 100 learns a specific model to make the device 200 perform a process.

The storage unit 10 stores data (hereinafter referred to as "training data") that associates a state vector s=(s1, s2, ...) which represents the state of the target environment with an action "a" performed in the state represented by the state vector. Here, as assumed in general reinforcement learning, an environment (hereinafter, referred to as the target environment) with multiple possible states, and an object (hereinafter referred to as the agent) who can perform multiple actions in that environment. In the following explanation, the state vector s may be referred to simply as state s.

An example of the agent is an autonomous car, for example. In this case, the target environment is represented as a set of states of the autonomous car and its surroundings (for example, maps of the surroundings, positions and speeds of other vehicles, and road conditions).

The action to be taken by the agent depends on the state of the target environment. In the example of an autonomous car described above, if there is an obstacle in front of the car, the car needs to proceed to avoid the obstacle. In other cases, the speed of the car needs to be changed according to the condition of the road surface ahead and the distance between the car and another car in front.

The function that outputs an action to be taken by the agent according to the state of the target environment is called a policy. The imitation learning unit 30, described below, generates a policy through imitation learning. If the policy is learned to be perfect, the policy outputs the optimal action to be taken by the agent depending on the state of the target environment.

The input unit 20 inputs a functional form of the reward to be generated by the imitation learning unit 30 described below. The functional form of the reward is a specific model for having the device 200 perform a process. For example, in the case of a quantum annealing machine, the functional form of the reward is an Ising model. In this example embodiment, the Ising model will be explained as an example as a functional form specific to quantum annealing. However, the functional form of the reward input to the input unit 20 is not limited to the Ising model.

For example, when the specialized device is a device that directly solves a binary neural network problem or a Hubbard model problem, the input unit 20 may accept input of a binary neural network or a Hubbard model as the functional form of the reward.

The imitation learning unit 30 performs imitation learning using the data associating the state vector s with the action a (i.e., the training data), and outputs a policy. The policy obtained by imitation learning imitates the given training data. Here, the policy, which is a rule for the agent to select an action, is denoted as $\pi$, and probability of selecting action a in state s under this policy it is denoted as $\pi(s, a)$. The method by which the imitation learning unit 30 performs imitation learning is arbitrary, and the imitation learning unit 30 can output a policy by performing imitation learning using a general method.

Furthermore, the imitation learning unit 30 performs imitation learning and outputs a reward function. Specifically, the imitation learning unit 30 determines a policy that uses the reward r(s) obtained by inputting the state vector s into the reward function r as an input to the function. In other words, the action a obtained from the policy is defined by Equation 1 illustrated below.

$$a \sim \pi(a|r(s))  \quad \text{(Equation 1)}$$

Therefore, the imitation learning unit 30 may formulate the policy as a functional of the reward function. By performing imitation learning using the policy formulated in this way, the imitation learning unit 30 can also learn the reward function, while learning the policy.

The probability of selecting state s' from a certain state s and action a can be expressed as $\pi(a|s)$. When the policy is defined as shown in Equation 1 above, a relationship of Equation 2 illustrated below can be defined, using the reward function r(s, a). The reward function r(s, a) may also be expressed as $r_a(s)$.

$$\pi(a|s):=\pi(a|r(s,a)) \quad \text{(Equation 2)}$$

Since the probability of selecting a policy $\pi(a|s)$ is related to the reward obtained by action a in a certain state s, the policy can be defined in the form of Equation 3 illustrated below, using the reward function $r_a(s)$ described above. It should be noted that $Z_R$ is the partition function, and $Z_R = \Sigma_a \exp(r_a(s))$.

[Math. 1]

$$\pi(a|s) := \frac{\exp(r_a(s))}{Z_R} \quad \text{(Equation 3)}$$

In this example embodiment, the imitation learning unit 30 learns a reward function based on the functional form of the input reward by imitation learning. For example, the functional form of the Ising model input to the quantum annealing machine is represented by Equation 4 shown below. In Equation 4, (s, a), which represents the state, corresponds to $\sigma$ in the Ising model, and the parameters $\theta$ correspond to Jij and hi.

[Math. 2]

$$H(t) = A(t)H_X + B(t)H_P, t \in [0, t_f] \quad \text{(Equation 4)}$$
$$H_X = -\Sigma_i \sigma_i^x$$
$$H_P = \sum_i h_i \sigma_i^z + \sum_{i<j} J_{ij} \sigma_i^z \sigma_j^z$$

At this time, the imitation learning unit 30 learns the reward function (specifically, the parameter $\theta$) based on the functional form of the Ising model shown in Equation 4 above. By learning the reward function using such a functional form, the imitation learning unit 30 can generate a reward function of the type required in the quantum annealing machine.

In the above description, an idea is illustrated that the imitation learning unit 30 learns the reward function by imitation learning, based on the functional form of the Ising model. However, the input function form is not limited to the Ising model. For example, when a device that uses the Hubbard model is used, the imitation learning unit 30 may learn the reward function by imitation learning based on a functional form of the Hubbard model.

The output unit 40 outputs the reward function generated as a result of the learning of the imitation learning unit 30.

The generated reward function does not need to be reconverted because it is generated as a model of the type required by the device 200. Therefore, the output unit 40 may directly input (set) the parameters identified by the generated reward function to the device 200.

The output unit 40 may also output an evaluation result for the generated reward function together. The method of evaluation for the reward function is arbitrary. For example, the output unit 40 may output closeness between expert data (training data) used for learning and prediction result based on the learned reward function as the evaluation result for each reward function.

The input unit 20, the imitation learning unit 30, and the output unit 40 are realized by a processor of a computer (for example, CPU (Central Processing Unit), GPU (Graphics Processing Unit), FPGA (field programmable gate array)) that operates according to a program (learning program).

For example, the program may be stored in the storage unit 10 of the learning device 100, and the processor may read the program and operate as the input unit 20, the imitation learning unit 30, and the output unit 40 according to the program. In addition, the function of the learning device 100 may be provided in a SaaS (Software as a Service) manner.

The input part 20, the imitation learning part 30, and the output part 40 may be realized by dedicated hardware, respectively. In addition, some or all of each component of each device may be realized by a general-purpose or dedicated circuit (circuitry), a processor, etc. or a combination of these. They may be configured by a single chip or by multiple chips connected via a bus. Some or all of components of each device may be realized by a combination of the above-mentioned circuitry, etc. and a program.

In the case where some or all of the components of the learning device 100 are realized by a plurality of information processing devices, circuits, or the like, the plurality of information processing devices, circuits, or the like may be centrally located or distributed. For example, the information processing devices, circuits, etc. may be realized as a client-server system, a cloud computing system, etc., each of which is connected through a communication network.

The storage unit 10 is realized by a magnetic disk or the like, for example.

Figure 2:
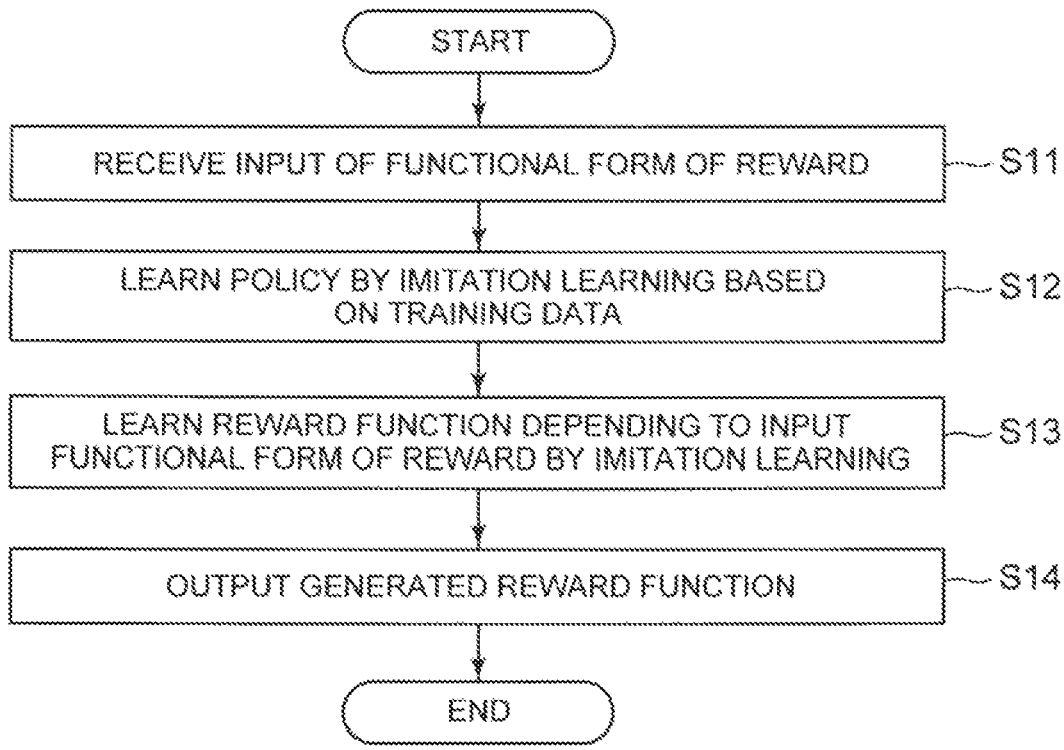
FIG. 2 It depicts a flowchart showing an example of an operation of a learning device.

Next, the operation of the learning device 100 of this example embodiment will be described. FIG. 2 is a flowchart showing an example of operation of the learning device 100 of this example embodiment. The input unit 20 receives an input of the functional form of the reward (step S11). The imitation learning unit 30 learns a policy by imitation learning based on the training data (Step S12). Furthermore, the imitation learning unit 30 learns a reward function depending on the input functional form of the reward by imitation learning (Step S13). The output unit 40 outputs the reward function generated as a result of the learning (Step S14).

As described above, in this example embodiment, the input unit 20 receives an input of a functional form of the reward, and the imitation learning unit 30 learns a policy by imitation learning based on training data. Furthermore, the imitation learning unit 30 learns a reward function depending on the input functional form of the reward by imitation learning. Thus, a specific model used in a quantum computer can be learned from the acquired data.

For example, when reward designing based on expert data is attempted, it has been difficult to model a real-world problem in a form required by the quantum computer, using a general method. On the other hand, in this example embodiment, the input unit 20 receives the input of the functional form of the reward, and the imitation learning unit 30 learns the reward function depending on the input functional form of the reward.

In the above example, the reward function of the Ising model can be obtained by setting and learning a reward function type (for example, functional form of the Ising model) specific to quantum annealing. Therefore, since reconverting an objective function to the Ising model is no longer required, the overall cost of the work can be reduced.

In addition, since the performance of the quantum annealing machine can be maximized by having the imitation learning unit 30 directly learn the reward function in accordance with a model used by the quantum annealing machine from the training data, various users become to be able to use the quantum annealing machine.

Figure 3:
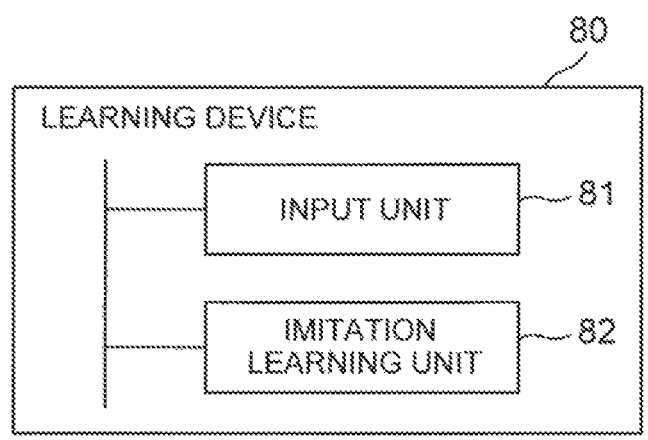
FIG. 3 It depicts a block diagram showing a summarized learning device according to the present invention.

Next, an overview of the present invention will be described. FIG. 3 is a block diagram showing a summarized learning device according to the present invention. A learning device 80 according to the present invention is a learning device (for example, learning device 100), for learning a model applied to a device (for example, device 200) that performs processing using a specific model, which comprises an input unit 81 (for example, input unit 20) which receives input of a functional form (for example, Ising model, Hubbard model, etc.) of a reward, and an imitation learning unit 82 (for example, imitation learning unit 30) which learns a policy by imitation learning based on training data.

The imitation learning unit 82 learns a reward function depending on the input functional form of the reward by the imitation learning.

By such a configuration, the learning device can directly learn a specific model used in a quantum computer from the acquired data.

Specifically, the imitation learning unit 82 may learn a reward function by formulating a policy as a functional of the reward function and performing imitation learning using the formulated policy.

The learning device 80 may be a learning device that learns a model applied to a device (for example, a quantum annealing machine) implementing quantum annealing based on an Ising model. In this case, the input unit 81 may receive the functional form of the Ising model, and the imitation learning unit 82 may learn the reward function depending on the functional form of the Ising model by the imitation learning.

Specifically, the imitation learning unit 82 may learn the policy by the imitation learning based on the training data associating a state with an action, and learns the reward function by determining parameters (for example, $J_{ij}$ and $h_i$ in Equation 4) of the Ising model upon mapping a spin (for example, σ in Equation 4) of the Ising model to the state and the action in the training data.

Figure 4:
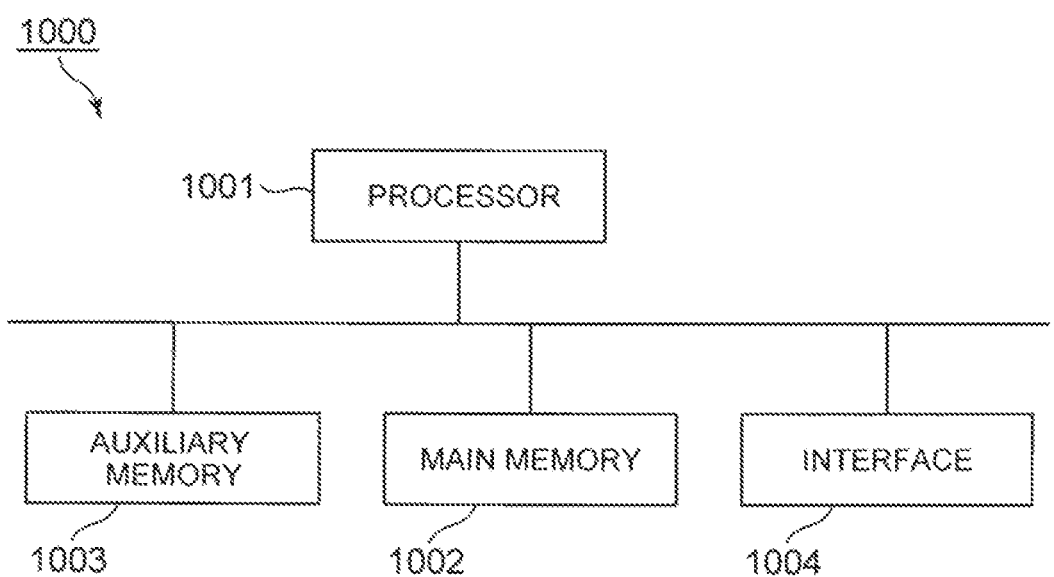
FIG. 4 It depicts a summarized block diagram showing a configuration of a computer for at least one example embodiment.

FIG. 4 is a summarized block diagram showing a configuration of a computer for at least one example embodiment. The computer 1000 comprises a processor 1001, a main memory 1002, an auxiliary memory 1003, and an interface 1004.

The learning device 80 described above is implemented in the computer 1000. The operation of each of the above mentioned processing units is stored in the auxiliary memory 1003 in a form of a program (learning program). The processor 1001 reads the program from the auxiliary memory 1003, deploys the program to the main memory 1002, and implements the above described processing in accordance with the program.

In at least one exemplary embodiment, the auxiliary memory 1003 is an example of a non-transitory tangible medium. Other examples of non-transitory tangible media include a magnetic disk, an optical magnetic disk, a CD-ROM (Compact Disc Read only memory), a DVD-ROM (Read-only memory), a semiconductor memory, and the like. When the program is transmitted to the computer 1000 through a communication line, the computer 1000 receiving the transmission may deploy the program to the main memory 1002 and perform the above process.

The program may also be one for realizing some of the aforementioned functions. Furthermore, said program may be a so-called differential file (differential program), which realizes the aforementioned functions in combination with other programs already stored in the auxiliary memory 1003.

REFERENCE SIGNS LIST

1 Information processing system
10 Memory unit
20 Input unit
30 Imitation learning unit
40 Output unit
100 Learning device
200 Device

What is claimed is:

1. A learning device comprising:
   a memory storing software code; and
   a hardware processor configured to execute the software code to:
   receive input of a functional form of a reward used in a reward function specifying a reward for performance of an action by an autonomous vehicle for a state of an environment of the autonomous vehicle, wherein
      the state includes one or more of a map of and/or road conditions in surrounding of the autonomous vehicle, and positions and/or speeds of other vehicles in the surroundings, and
      the action includes changing a path of the autonomous vehicle and a speed of the autonomous vehicle;
   specify a model by which the reward function is to be learned, based on the functional form of the reward, wherein the functional form of the reward is input as a binary neural network or a Hubbard model;
   learn the reward function according to the specified model, thereby learning a policy for selecting the action to be performed by the autonomous vehicle based on the state of the environment of the autonomous vehicle;
   receive a state of the environment of the autonomous vehicle;
   determine the action to be performed by the autonomous vehicle by applying the learned policy to the state of the environment of the autonomous vehicle; and
   control the autonomous vehicle to cause the autonomous vehicle to perform the determined action, wherein
   when the state indicates that there is an obstacle in front of the autonomous vehicle, the determined action is to change the path of the autonomous vehicle to avoid the obstacle, such that the learned policy provides a practical improvement in autonomous vehicle technology in that the learned policy provides for obstacle avoidance.

2. The learning device according to claim 1, wherein the hardware processor is configured to execute the software code to formulate the policy as a functional of the reward function, and perform imitation learning using the formulated policy to learn the reward function.

3. The learning device according to claim 1, wherein
   the learning device learns the model, which implements quantum annealing, based on an Ising model, and
   the hardware processor is configured to execute the software code to:
   receive the functional form of the Ising model; and
   learn the reward function depending on the functional form of the Ising model by imitation learning.

4. The learning device according to claim 3, wherein the hardware processor is configured to execute the software code to
   learn the policy by the imitation learning based on training data associating a state with an action, and learn the reward function by determining parameters of the Ising model upon mapping a spin of the Ising model to the state and the action in the training data.

5. A method comprising:
   receiving input of a functional form of a reward used in a reward function specifying a reward for performance of an action by an autonomous vehicle for a state of an environment of the autonomous vehicle, wherein
      the state includes one or more of a map of and/or road conditions in surrounding of the autonomous vehicle, and positions and/or speeds of other vehicles in the surroundings, and
      the action includes changing a path of the autonomous vehicle and a speed of the autonomous vehicle;
   specifying a model by which the reward function is to be learned, based on the functional form of the reward, wherein the functional form of the reward is input as a binary neural network or a Hubbard model;
   learning the reward function according to the specified model, thereby learning a policy for selecting the action to be performed by the autonomous vehicle based on the state of the environment of the autonomous vehicle;
   receiving a state of the environment of the autonomous vehicle;
   determining the action to be performed by the autonomous vehicle by applying the learned policy to the state of the environment of the autonomous vehicle; and
   controlling the autonomous vehicle to cause the autonomous vehicle to perform the determined action, wherein
   when the state indicates that there is an obstacle in front of the autonomous vehicle, the determined action is to change the path of the autonomous vehicle to avoid the obstacle, such that the learned policy provides a practical improvement in autonomous vehicle technology in that the learned policy provides for obstacle avoidance.

6. The learning method according to claim 5, further comprising
   formulating the policy as a functional of the reward function, and performing imitation learning using the formulated policy to learn the reward function.

7. A non-transitory computer readable information recording medium a learning program executable by a computer to perform a method comprising:
   receiving input of a functional form of a reward used in a reward function specifying a reward for performance of an action by an autonomous vehicle for a state of an environment of the autonomous vehicle, wherein the state includes one or more of a map of and/or road conditions in surrounding of the autonomous vehicle, and positions and/or speeds of other vehicles in the surroundings, and the action includes changing a path of the autonomous vehicle and a speed of the autonomous vehicle;

specifying a model by which the reward function is to be learned, based on the functional form of the reward, wherein the functional form of the reward is input as a binary neural network or a Hubbard model;

learning the reward function according to the specified model, thereby learning a policy for selecting the action to be performed by the autonomous vehicle based on the state of the environment of the autonomous vehicle;

receiving a state of the environment of the autonomous vehicle;

determining the action to be performed by the autonomous vehicle by applying the learned policy to the state of the environment of the autonomous vehicle; and controlling the autonomous vehicle to cause the autonomous vehicle to perform the determined action, wherein when the state indicates that there is an obstacle in front of the autonomous vehicle, the determined action is to change the path of the autonomous vehicle to avoid the obstacle, such that the learned policy provides a practical improvement in autonomous vehicle technology in that the learned policy provides for obstacle avoidance.

8. The non-transitory computer readable information recording medium according to claim 7, the method further comprising formulating the policy as a functional of the reward function, and performing imitation learning using the formulated policy to learn the reward function.

* * * * *